J. V. M. RISBERG.
DAIRY UNIT WITH STEAM AS HEATING MEANS.
APPLICATION FILED OCT. 29, 1913.
1,179,760. Patented Apr. 18, 1916.
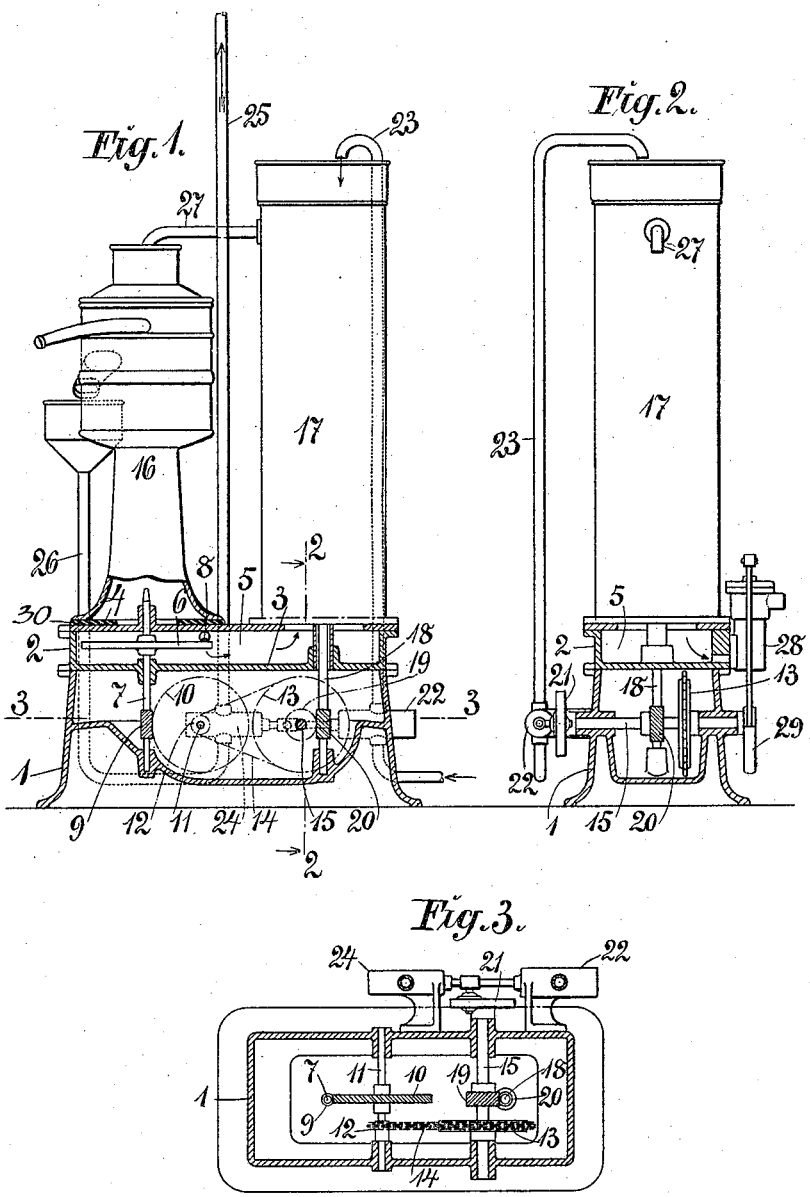

UNITED STATES PATENT OFFICE.

JOHANNES VALDEMAR MÅRTEN RISBERG, OF SÖDERTELJE, SWEDEN, ASSIGNOR TO AKTIEBOLAGET BALTIC, OF SÖDERTELJE, SWEDEN, A CORPORATION OF SWEDEN.

DAIRY UNIT WITH STEAM AS HEATING MEANS.

1,179,760.   Specification of Letters Patent.   Patented Apr. 18, 1916.

Application filed October 29, 1913. Serial No. 798,052.

*To all whom it may concern:*

Be it known that I, JOHANNES VALDEMAR MÅRTEN RISBERG, a subject of the King of Sweden, and resident of Badhusgatan 16, Södertelje, in the Kingdom of Sweden, have invented certain new and useful Improvements in Dairy Units with Steam as Heating Means, of which the following is a specification, reference being had therein to the accompanying drawing.

In modern so called turbine dairies means are used for transmitting power from the steam-turbine provided in the frame of the separator to a central shaft, actuating other dairy apparatus coöperating with the separator. The said means consists of a shaft, which is journaled in the frame of the separator and, by means of a worm-gear, is rotated by the shaft of the turbine or by the spindle of the separator drum directly connected with the same. The power is transmitted from the shaft first mentioned to the said central shaft by means of sprocket wheels and a chain or the like. The exhaust steam of the turbine passes through a special conduit to the milk-heater. The said arrangement forms a very great improvement compared with the old method of actuating the apparatus viz. by means of a plurality of turbines connected with the apparatus respectively, but has some drawbacks. The transmitting of the power, for instance, from the said turbine, located in the frame of the separator, to the central shaft involves some difficulties, due to the fact that forcible vibrations of the separator frame sometimes result from the great velocity of the separator drum and the comparatively great weight of the same, which vibrations have a disturbing effect upon the transmitting of the power. It is advisable to have the frame mounted on a yielding layer of rubber or like substance so that the frame may adapt itself to a certain extent to the vibrations of the separator drum, since in driving the separator the drum sometimes gets slightly off center and in such a situation if the frame is rigidly connected to its support, it cannot adapt itself to the vibrations of the drum and the bearing points would consequently be rapidly worn away. From this it will be seen, that fettering the separator frame in one way or another, as is done for instance in the case stated above, i. e. when power is transmitted from a steam-turbine located in the said frame and also when the steam admitting and discharging pipes of the turbine are connected with the said frame, should be obviated. The said disadvantages are removed by the present invention. In the present structure the steam turbine is located in a separate casing, which also contains means for transmitting power from the shaft of the turbine to the central shaft and, it may be, to other shafts actuating several apparatus. The said casing is, preferably, adapted to serve as a foundation stand for the separator, the milk heater, pumps and other apparatus belonging to the dairy, and contains a passage for the exhaust steam of the turbine, which ends at one of the walls of the casing, so that the steam, if desired, may pass directly into the said heater, which latter is so mounted that it covers the mouth of the said passage. The separator is mounted on the casing of the turbine and the spindle of the separator is coupled directly to the shaft of the turbine. Between the frame of the separator and the said casing a yielding layer is preferably provided, so that the frame of the separator can vibrate freely and in an unfettered manner, if necessary.

Figure 1 in the accompanying drawing is a vertical longitudinal section of a steam turbine arranged in accordance with this invention. Fig. 2 is a cross section on the line 2 to 2 and Fig. 3 is a horizontal section on the line 3 to 3 of Fig. 1.

For facilitating the manufacture of the turbine casing the latter is made in two parts 1 and 2, separated by a partition bottom 3. The turbine casing is closed by a cover 4. The chamber 5 between the bottom 3 and the cover 4 contains the wheel or disk 6 of the turbine, the vertical shaft 7 of which is journaled in bearings provided in the casing 1, 2. The steam passes to the said disk 6 through one or more nozzles 8. The exhaust steam passes from the disk 6 through the chamber or channel 5, ending in an opening provided in the cover 4. The bottom chamber 1 of the casing contains the central shaft and other shafts and also the motion transmitting device, by means of which the turbine rotates the shafts. In the drawing the said motion transmitting device comprises a worm 9 provided on the shaft 7 of the turbine, which at a reduced rate rotates the worm wheel 10 fixed to an auxiliary shaft 11. The shaft last mentioned transmits the motion at a further reduced rate to the central shaft 15 by means of sprocket wheels 12, 13 and a chain 14. From the shaft 15 power is derived for the actuating of the pumps and the stirrer of the milk heater belonging to the dairy. An ordinary gearing may, evidently, be substituted for the sprocket wheels 12, 13 and the chain 14.

As shown in Fig. 1 the shaft 7 of the turbine extends upward through the cover 4. Owing to the said arrangement the spindle of the drum of the separator 16 located on the cover 4 may be connected directly with the shaft 7. Between the frame of the separator and the cover 4 a suitable yielding layer (not shown) is provided. Also the milk heater 17 is located on the cover 4 and in such manner, that it covers the mouth of the channel 5, (to the said mouth, however, a pipe may be applied, communicating with the inlet opening of the milk heater, when located at the side of the mouth). Consequently, the exhaust steam of the turbine passes from the channel 5 directly into the steam chamber of the heater. The heater is provided, as usually, with a stirrer. The shaft of the said stirrer is connected with a vertical shaft 18, journaled in the casing of the turbine. The shaft 18 is rotated by the central shaft 15 by means of a worm wheel 19 fixed to the central shaft and a worm 20 provided on the shaft 18. As seen from the drawing, the separator 16 and the heater 17 are very easily mounted on the casing of the turbine. The separator 16 is yieldingly connected with the casing and is not fettered by motion transmitting parts or by pipes connected with it. Consequently, the frame of the separator is not prevented from partaking of the vibrations of the separator drum, if any. Also pumps, necessary for the dairy, are actuated by the central shaft. For that purpose the said shaft is provided with a crank disk 21, which actuates both a pump 22, forcing the milk upward through a pipe 23 to the top part of the heater 17, and a pump 24, to which the skim-milk passes from the separator 16 through a pipe 26 and which forwards the said milk through a pipe 25 to a cooler, a reservoir or the like. The heater 17 is of a suitable recuperative type and receives exhaust steam from the turbine, as already stated. The milk is heated while passing through the heater to the separator, to which it passes through a pipe 27, and at the same time the exhaust steam is condensed in the heater. The water of condensation runs downward into the channel 5 and is removed by a pump 28, which, if desired, may have such a capacity that it will also remove from the heater air and uncondensed steam. Consequently, vacuum is effected in the steam chamber of the heater and in the channel 5, which facilitates the driving of the turbine. The pump 28 is actuated by the shaft 15 by means of an eccentric 29.

As will be seen from the foregoing, the frame of the separator is not affected either by the motion transmitting devices or by steam-pipes. Other advantages consist for instance in the separator, the heater and the other apparatuses being easily changed, if necessary, or substituted by larger or smaller ones. Any steam motor operating rapidly may be substituted for the turbine 6, 8 as will be easily understood by those skilled in the art.

Having now described my invention, what I claim as new and desire to secure by Letters Patent is:

1. In a dairy unit in which steam is used for heating purposes, the combination of a casing, a steam motor and shaft located within the casing, means for transmitting motion from the motor to the shaft, a separator yieldingly connected with the casing and located in intimate coöperative relation to the motor, and means for directing exhaust steam from the motor to the exterior of the casing, substantially as described and for the purpose set forth.

2. In a dairy unit in which steam is used for heating purposes, the combination of a casing, a steam motor and shaft located within the casing, means for transmitting motion from the motor to the shaft, a separator yieldingly connected with the casing and supported on the casing over the motor and means for directing exhaust steam from the motor to the exterior of the casing, substantially as described and for the purpose set forth.

3. In a dairy unit in which steam is used for heating purposes, the combination of a casing, a steam motor and several shafts located within the casing, means for transmitting motion from the motor to the several shafts, a separator and a heater located on the casing and means for directing exhaust steam from the motor to the exterior of the casing, substantially as described and for the purpose set forth.

In witness whereof, I have hereunto signed my name in the presence of two subscribing witnesses.

JOHANNES VALDEMAR MÅRTEN RISBERG.

Copies of this patent may be obtained for five cents each, by addressing the "Commissioner of Patents, Washington, D. C."